Figure 1:
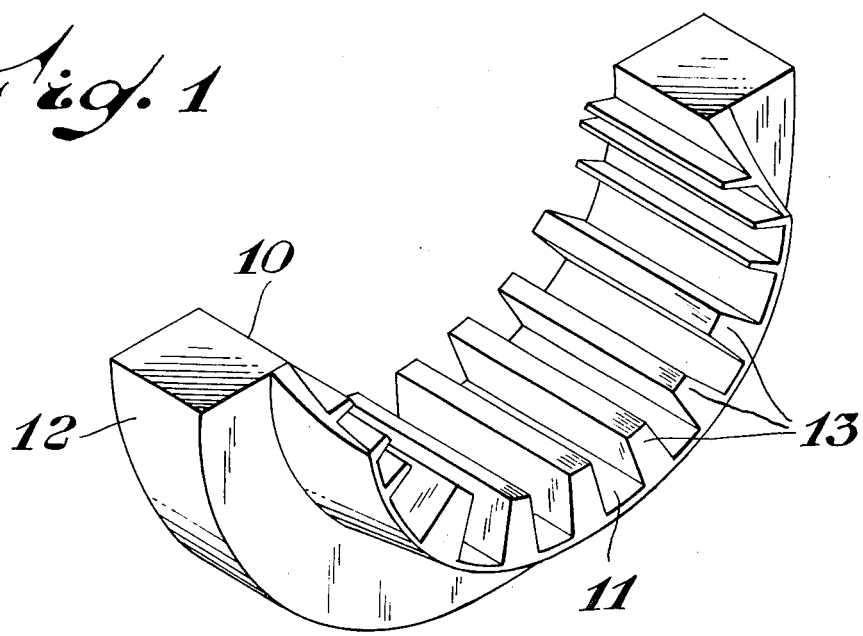

United States Patent [19]
Sargent et al.

[11] 3,722,695
[45] Mar. 27, 1973

[54] ARTICLE FOR FABRICATING PERMEABLE HOLLOW FIBER SEPARATORY ELEMENT TUBE SHEETS AND SEPARATORY ELEMENTS PREPARED THEREFROM

[75] Inventors: John A. Sargent, Berkeley; Francis W. Straub, Pittsburg, both of Calif.

[73] Assignee: The Dow Chemical Company, Midland, Mich.

[22] Filed: July 19, 1971

[21] Appl. No.: 163,896

[52] U.S. Cl. ................................................210/321
[51] Int. Cl. ............................................B01d 31/00
[58] Field of Search ..210/22, 23, 321, 500; 264/258; 55/158

[56] References Cited

UNITED STATES PATENTS

| | | | |
|---|---|---|---|
| 3,228,877 | 1/1966 | Mahon | 210/22 |
| 3,570,673 | 3/1971 | Dutz et al. | 210/500 X |

*Primary Examiner*—Frank A. Spear, Jr.
*Attorney*—H. L. Aamoth et al.

[57] ABSTRACT

An annular segment having projections which extend radially inward from the inner surface thereof provides numerous benefits and advantages in preparing separatory elements wherein end portions of hollow permeable fibers are disposed within the arc of the segment and are potted in a solidifiable resin whereby the fiber ends, the segment and the potting resin form an integral tube sheet structure.

4 Claims, 9 Drawing Figures

PATENTED MAR 27 1973

3,722,695

SHEET 1 OF 2

INVENTORS.
John A. Sargent
Francis W. Straub
BY  H. L. Aamoth
AGENT

INVENTORS.
John A. Sargent
Francis W. Straub
BY H. L. Aamoth
AGENT

ARTICLE FOR FABRICATING PERMEABLE HOLLOW FIBER SEPARATORY ELEMENT TUBE SHEETS AND SEPARATORY ELEMENTS PREPARED THEREFROM

REFERENCES

The invention described herein was made in the course of, or under, a contract with the Department of Health, Education and Welfare.

This invention relates broadly to an improvement in the fabrication of permeable hollow fiber separatory elements and especially relates to a novel pre-formed article for use in the manufacture of the separatory element tube sheets wherein the article becomes an integral part of said tube sheet.

Hollow fiber separatory devices useful for dialysis, ultrafiltration, reverse osmosis, hemodialysis, blood oxygenation and the like are well known. Various methods of manufacture have been described and in general the resulting separatory element consists of a plurality of fine hollow fibers whose end portions are potted in a tube sheet and whose open fiber ends terminate in a tube sheet face which provides liquid access to the interior of the fibers. The separatory elements are then inserted and sealed within a casing to form a separatory cell having liquid ports which allow for the passage of one fluid through the fibers and another around the fibers without mixing of the two fluids. The separatory element may have two tube sheets or may have a single tube sheet in the case where the fibers are doubled back so that all the ends terminate in one tube sheet. The general configuration of the separatory element and separatory cell is similar to a tube-and-shell heat exchanger.

Patents representative of the art of hollow fiber separatory devices include U.S. Pat. Nos. 2,972,349; 3,228,876; 3,228,877; 3,422,008; 3,423,491; 3,339,341; 3,503,515 and the like.

Figure 2:
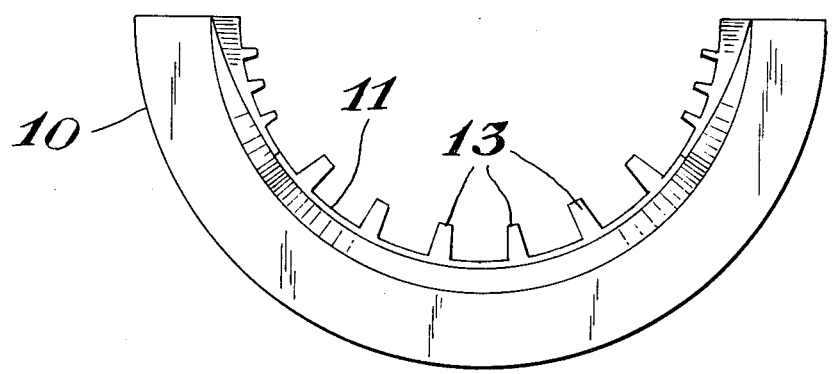
Figure 3A:
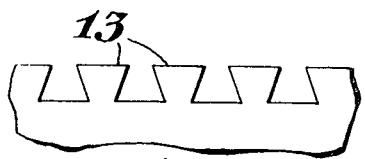
Figure 3B:
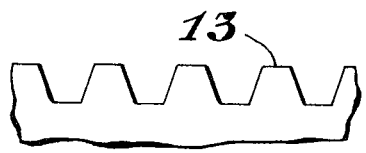
Figure 3C:
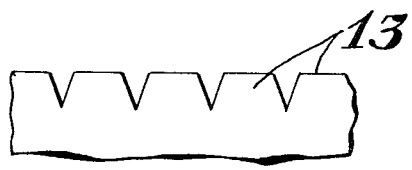
Figure 3D:
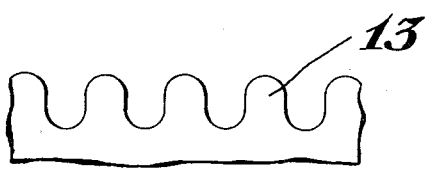

The pre-formed article of the invention comprises an annular segment having an inner and an outer surface, wherein the segment has an arc greater than about 120° but less than 180°, wherein the inner surface has a plurality of spaced apart projections which extend radially inward and wherein the projections traverse the segment substantially transverse to the arc of the segment. A preferred embodiment of said article is shown in FIG. 1. An annular segment 10 is shown which has an inner surface 11 and an outer surface 12. Projections 13 extend from the inner surface 11 radially inwardly. A side view is shown in FIG. 2 which shows a preferred arrangement of the projections 13 wherein the projections in the central portion are regularly spaced apart and are of uniform cross-section and the remaining projections are about half as large in cross-section and about half as far apart as those in the central portion. The projections 13 may have a variety of cross-sectional configurations as shown in FIGS. 3a, 3b, 3c and 3d.

The usefulness of said article in preparing the tube sheets of a separatory element wherein the article becomes an integral part of the tube sheet is best illustrated by describing a preferred method of fabrication.

In the preferred method a plurality of mold forms are mounted on the periphery of a wheel. The mold forms are adapted to receive at each end an annular segment similar to that shown in FIG. 1 and discussed above. A continuous length of hollow fibers is then wound into the mold forms by rotating the wheel. As the wheel rotates hollow fibers are disposed within the arc of the annular segments and as each segment passes a resin dispensing station located adjacent the wheel an incremental amount of a solidifiable resin is applied to that portion of the fibers disposed with the arc of the segment. In this manner the fibers are simultaneously potted in said resin as each new winding of hollow fibers is laid down in the molds. The wheel is rotated until the arc portion of the segment is substantially filled with hollow fibers and potting resin at which point the winding is stopped. After winding of the fiber is stopped, the rotation of the wheel may be continued until the resin has fully hardened. Alternatively the fibers may be cut between each mold and the separatory element removed for completion of the resin cure by storage at room temperature or accelerating the cure by heating in an oven, for example.

The above fabrication process is described in greater detail as well as various modifications thereof in an application by B. J. Lipps entitled, "A Process and Apparatus for Fabricating Permeable Hollow Fiber Separatory Elements and Separatory Cells," Ser. No. 876,697 filed on Nov. 14, 1969 and is incorporated herein by reference to illustrate the state of the art. Various other methods of fabrication may be employed including the simple expedient of hand fabrication wherein the fibers are disposed in the annular segments and the potting resin applied by hand.

The separatory element as prepared by the above described process may be employed in a suitably designed separatory cell but it is preferred to join together in end to end relationship a pair of such separatory elements forming a larger element wherein the joined together elements have a circular tube sheet configuration rather than the hemicircular configuration formed with a single annular segment. The pair of separatory elements may be joined merely by laying down an adhesive layer across the fibers from each end of the segment and clamping two hemicircular tube sheets together in such a manner as to form a circular tube sheet.

Figure 4:
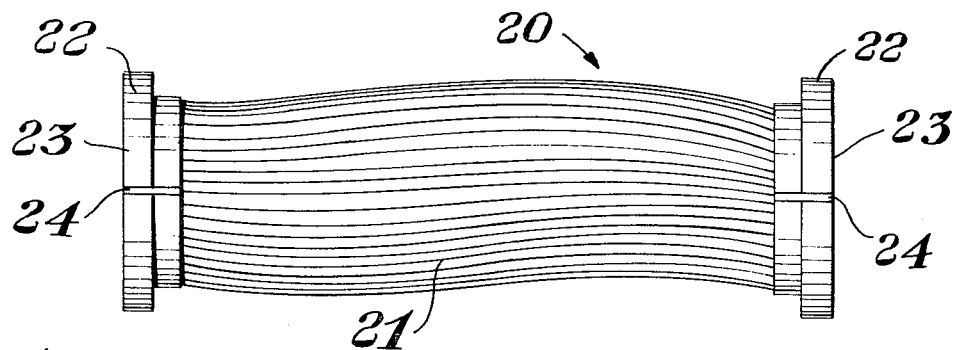
Figure 5:
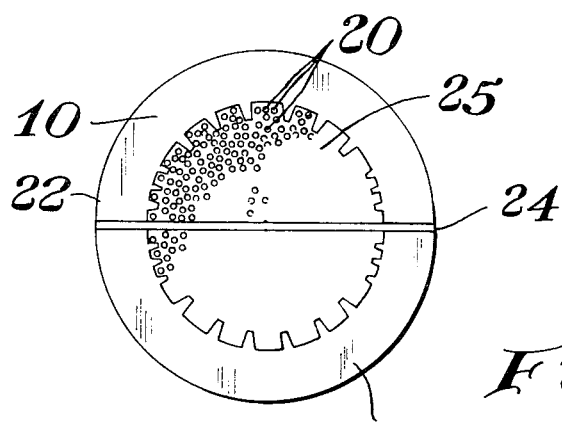

A side view of a separatory element prepared by joining together a pair of said elements is shown in FIG. 4. The separatory element 20 comprises a bundle of hollow fibers 21 having a tube sheet 22 at each end of the bundle. The end portions of the hollow fibers 20 terminate in the tube sheets 21. The open ends of the hollow fibers 20 terminate in a tube sheet face 23. The adhesive layer 24 joins the two hemicircular tube sheets together. An end view of one of the tube sheets is shown in FIG. 5 wherein the annular segments 10 are integrally bonded by means of the potting resin 25 to the hollow fibers 20 disposed within the arc of the segments. The two hemicircular tube sheets are joined together by the adhesive layer 24.

Figure 6:
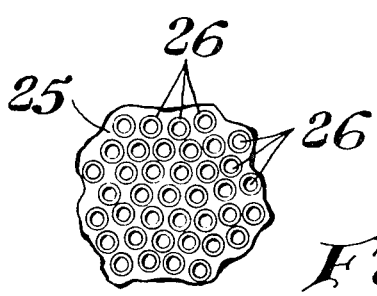

A partial magnified view of the face of the tube sheet 22 is shown in FIG. 6 where the hollow fibers 20 are potted in the resin 25. The open ends 26 of the hollow fibers terminate in the face of the tube sheet 22.

The fine bore permeable hollow fibers may be prepared from a variety of polymeric and natural materials such as cellulose, cellulose esters and ethers, polyamides, polyesters, polyureas and the like. For this invention any hollow fiber may be employed. A wide range of fiber diameters, inside (I.D.) and outside (O.D.) may be used. For permeability purposes, hollow fibers as small as 10 microns O.D. with a wall thickness of about 1 micron are useful. Larger fibers up to 300 to 500 microns with wall thicknesses up to 80 microns may also be used, but it is usually desirable to employ fibers in the smaller sizes in order to obtain the maximum amount of permeable surface per volume of the separatory cell. However, the invention is not limited to such sizes and larger hollow fibers may be employed.

A variety of potting resins may be employed including the thermoplastic materials which may be applied as a melt and then set (harden) merely by cooling. Generally it is preferred to use thermosettable resins such as polyepoxides, polyurethanes, etc. because of their greater strength and better physical and chemical properties. Silicone rubber may be advantageously used, especially medical grade silicones, when the ultimate use of the separatory cell is designed for hemodialysis (artificial kidney) or blood oxygenation. Since the potting resin may also be used to prepare the annular segments it is frequently desirable to prepare said segment and to pot the fibers with the same resinous material. Likewise the same potting resin is generally used as the adhesive to join together pairs of separatory elements as previously described.

The annular segments may be prepared from a variety of materials including metals, plastics and the like. Plastic materials are particularly suitable since they may be readily molded into the desired shape. Medical grade silicones are especially useful for biomedical devices. Advantageously the silicone rubbers are elastic and provide effective fluid tight seals around the tube sheet. However harder materials such as thermoset epoxy resins are commonly used. It is also contemplated that reinforcing materials such as glass fibers, etc. may be employed in making said segments.

The annular segments provide several benefits and advantages during the fabrication step and to the completed tube sheet. Said segment during fabrication of the separatory element maintains the position of the fibers during the initial stages of winding and of the potted fiber bundle. Preferably the segment is constructed as shown in FIG. 1 with an inner surface of greater width than the outer surface to provide a larger surface for bonding between the fibers and the segment. The projections (or teeth) also increase the bonding surface area and additionally are spaced sufficiently apart that the fibers may lie in the space between them.

Since the annular segment ultimately becomes a circumferential part of the tube sheet it also helps to support and position the tube sheet in the outer shell or jacket of the separatory cell. It also acts as a sealing gasket between the two fluid compartments of the cell, i.e., the fluid compartment for fluid flow through the fibers and the compartment for fluid flow around the fibers.

The arc of the segment is less than 180° in order to provide sufficient space for the adhesive layer. Generally the segment has an arc of at least about 120°. The projections or teeth may have a variety of cross-sectional configurations as shown in the drawing. FIG. 2 shows a preferred spacing of the projections where those in the end portions are smaller and are spaced correspondingly closer together than those in the central portion. Generally the height of the projections should be at least equal to their base width and should be about 7 to 10 times the diameter of a single fiber. The projections should be substantially transverse to the arc of the segment in order that individual fibers may be pulled down between them but some deviation may be tolerated.

As indicated, hand fabrication techniques may be employed. A continuous length of fiber (or a tow of fibers) may be unwound from a bobbin and laid down within the arc of said segment and potted with a suitable resin by hand. Depending on the length of fibers desired between the tube sheets the fibers are unwound further and potted within the arc of a second segment. The fibers are then cut. This process is then repeated until a sufficient amount of fibers are potted in the two segments. Alternatively a bundle of fibers of sufficient length may be laid down and potted within the segment arcs in one operation. It is also contemplated to double back a bundle of fibers and pot all the fiber ends in a single annular segment.

What is claimed is:

1. An article especially adapted for preparing permeable hollow fiber separatory element tube sheets wherein said article becomes an integral part of the tube sheet, said article comprising an annular segment having an inner and outer surface, wherein said segment has an arc greater than about 120° but less than 180°, wherein said inner surface has a plurality of spaced apart projections which extend radially inward and wherein said projections traverse the segment substantially transverse to the arc of the segment.

2. The article of claim 1 wherein the inner surface is wider than the outer surface.

3. The article of claim 1 wherein said projections in the central portion of the annular segment are of uniform size and regularly spaced apart and wherein the remaining projections are smaller and are spaced closer together.

4. A permeable hollow fiber separatory element having a plurality of said fibers whose end portions terminate in a tube sheet and whose open fiber ends terminate in a tube sheet face, said tube sheet comprising a pair of annular segments according to claim 1 positioned in end to end relationship so as to encircle said fiber ends which are disposed within the arc of said segments and wherein said segments and fiber ends are integrally bonded together into a tube sheet by a solidified resin.

* * * * *